US010438140B2

(12) United States Patent
Nogami et al.

(10) Patent No.: US 10,438,140 B2
(45) Date of Patent: Oct. 8, 2019

(54) INFORMATION PROCESSING APPARATUS, VISIT PLAN CREATING METHOD, AND STORAGE MEDIUM

(71) Applicant: CANON KABUSHIKI KAISHA, Tokyo (JP)

(72) Inventors: Atsushi Nogami, Tokyo (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 15/156,076

(22) Filed: May 16, 2016

(65) Prior Publication Data

US 2016/0342908 A1 Nov. 24, 2016

(30) Foreign Application Priority Data

May 20, 2015 (JP) ................................ 2015-102818

(51) Int. Cl.
*G06Q 10/04* (2012.01)
*G06Q 10/10* (2012.01)

(52) U.S. Cl.
CPC ....... *G06Q 10/047* (2013.01); *G06Q 10/1095* (2013.01)

(58) Field of Classification Search
CPC .................... G06Q 30/08; G06Q 10/00–99/00
USPC ............................................. 705/7.11–7.42
See application file for complete search history.

(56) References Cited

U.S. PATENT DOCUMENTS

| 2003/0057029 | A1* | 3/2003 | Fujino ...................... B66B 3/00 187/391 |
| 2009/0132321 | A1* | 5/2009 | Kamisuwa ............. G06Q 10/06 705/7.22 |
| 2011/0004419 | A1* | 1/2011 | Ue ..................... G05B 23/0254 702/34 |
| 2013/0051239 | A1* | 2/2013 | Meredith .............. H04W 16/18 370/241 |
| 2014/0129365 | A1* | 5/2014 | Harris .................... G06Q 30/08 705/26.3 |
| 2014/0336791 | A1* | 11/2014 | Asenjo ................. G05B 13/026 700/44 |
| 2016/0342908 | A1* | 11/2016 | Nogami ............... G06Q 10/047 |

OTHER PUBLICATIONS

Fronzaa, Ilenia, et al. "Failure Prediction Based on Log Files Using Random Indexing and Support Vector Machines." The Journal of Systems and Software, vol. 86, No. 1, Jan. 2013, pp. 2-11. (Year: 2013).*

* cited by examiner

*Primary Examiner* — Alan S Miller
*Assistant Examiner* — Jay-Ming Wang
(74) *Attorney, Agent, or Firm* — Canon U.S.A., Inc., IP Division (57) ABSTRACT

To enable a response to an urgent call-out caused by a failure occurrence, the degree of an occurrence of a failure in each of a plurality of apparatuses installed at different locations is predicted and a visit plan of each of a plurality of servicemen is created based on a prediction result.

13 Claims, 7 Drawing Sheets

| APPARATUS ID | SERVICEMAN IN CHARGE | WORK |
|---|---|---|
| ID002 | SERVICEMAN A | REGULAR VISIT |
| ID011 | SERVICEMAN A | REPLACEMENT OF END-OF-LIFE PART A |
| ID018 | SERVICEMAN B | RESPONSE TO FAILURE PREDICTION A |
| ... | ... | ... |
| ID321 | SERVICEMAN J | REGULAR VISIT |

FIG. 5
VISIT PLAN BY SERVICEMAN A

| | ONE DAY AFTER | | TWO DAYS AFTER | | THREE DAYS AFTER | | FOUR DAYS AFTER | | FIVE DAYS AFTER | |
|---|---|---|---|---|---|---|---|---|---|---|
| | APPARATUS ID | WORK | APPARATUS ID | WORK | APPARATUS ID | WORK | APPARATUS ID | WORK | APPARATUS ID | WORK |
| AM | ID152 | RESPONSE TO FAILURE PREDICTION | ID011 | REPLACEMENT OF END-OF-LIFE PART | ID002 | REPLACEMENT OF END-OF-LIFE PART | ID121 | REGULAR VISIT | ID212 | REGULAR VISIT |
| PM | ID153 | REGULAR VISIT | ID153 | REGULAR VISIT | ID168 | REPLACEMENT OF END-OF-LIFE PART | ID147 | REGULAR VISIT | ID028 | REGULAR VISIT |

501

VISIT PLAN BY SERVICEMAN B

| | ONE DAY AFTER | | TWO DAYS AFTER | | THREE DAYS AFTER | | FOUR DAYS AFTER | | FIVE DAYS AFTER | |
|---|---|---|---|---|---|---|---|---|---|---|
| | APPARATUS ID | WORK | APPARATUS ID | WORK | APPARATUS ID | WORK | APPARATUS ID | WORK | APPARATUS ID | WORK |
| AM | ID162 | RESPONSE TO FAILURE PREDICTION | ID225 | REGULAR VISIT | ID125 | REGULAR VISIT | ID071 | REPLACEMENT OF END-OF-LIFE PART | ID033 | REGULAR VISIT |
| PM | ID064 | RESPONSE TO FAILURE PREDICTION | ID095 | REGULAR VISIT | ID181 | REGULAR VISIT | ID115 | REGULAR VISIT | ID055 | REGULAR VISIT |

| SERVICEMAN NAME | PROCESSING CAPABILITY S |
|---|---|
| SERVICEMAN A | 5 |
| SERVICEMAN B | 10 |
| ⁎ | ⁎ |
| ⁎ | ⁎ |
| ⁎ | ⁎ |
| SERVICEMAN X | 2 |

INFORMATION PROCESSING APPARATUS, VISIT PLAN CREATING METHOD, AND STORAGE MEDIUM

BACKGROUND

Field

Aspects of the present invention generally relate to a technique for creating a visit plan by a serviceman.

Description of the Related Art

To maintain and manage an image forming apparatus, a serviceman regularly visits an image forming apparatus to be managed. The image forming apparatus to be managed is installed at various locations such as an office of each of users and the like. Therefore, the image forming apparatus is desirably efficiently visited. The problem that a visit plan to make an efficient visit is created is generally referred to as a traveling salesman problem. A technique for solving the problem is Japanese Patent Application Laid-Open No. 2006-209383. Japanese Patent Application Laid-Open No. 2006-209383 discusses a technique for creating a visit plan in consideration of a movement cost.

On the other hand, a visit plan of a serviceman for predicting a failure in an image forming apparatus and a consumption time and a failure occurrence of a part and replacing the part at an appropriate timing can also be created. For the part replacement, when a replacement time is earlier than a predicted failure time, a maintenance cost increases. A risk of the failure occurrence increases when the replacement time is later than the predicted failure time. As a technique considering these, Japanese Patent Application Laid-Open No. 2009-217718 discusses a technique for creating a repair plan to simultaneously minimize a maintenance cost and a failure risk. The techniques are techniques relating to visit plans of apparatuses arranged at various positions. A target apparatus is not limited to the image forming apparatus.

As discussed in Japanese Patent Application Laid-Open No. 2006-209383 and Japanese Patent Application Laid-Open No. 2009-217718, a visit plan is created in consideration of a movement cost, a maintenance cost, and a failure risk in a conventional technique. On the other hand, when a serious failure occurs in an apparatus to be managed, and the apparatus is brought into an inoperable state, a serviceman needs to be urgently called out to the apparatus in which the failure has occurred regardless of a visit destination during the plan. At this time, to shorten downtime of the apparatus, the serviceman needs to quickly move to an installation position of the apparatus.

However, in a conventional technique relating to visit plan creation, a visit plan considering such an urgent call-out has not been created. More specifically, a visit plan has not been created in consideration of an urgent call-out to a failure that has occurred in an apparatus excluded from the visit plan.

SUMMARY

According to an aspect of the present invention, an information processing apparatus including at least one processor and memory in communication with each other and cooperating to act as a prediction unit configured to predict a degree of an occurrence of a failure in each of a plurality of apparatuses taken charge of by a plurality of servicemen and installed at different locations and a creation unit configured to create a visit plan of each of the plurality of servicemen to make a visit in a predetermined period based on the degrees of the failure occurrences predicted for the plurality of apparatuses and a relationship between the plurality of apparatuses and locations of the plurality of servicemen.

Further features of aspects of the present invention will become apparent from the following description of exemplary embodiments with reference to the attached drawings.

DESCRIPTION OF THE EMBODIMENTS

A first exemplary embodiment aims at creating a visit plan by a serviceman for maintenance such as part replacement, maintenance, and cleaning of respective apparatuses installed at a plurality of positions. In the present exemplary embodiment, a configuration in which a visit plan of each of a plurality of servicemen engaged at a service deposit that manages a plurality of apparatuses is created will be described. While an image forming apparatus will be described as an example of an apparatus to be managed by the serviceman, a target apparatus in the present exemplary embodiment is not limited to this.

Figure 1:
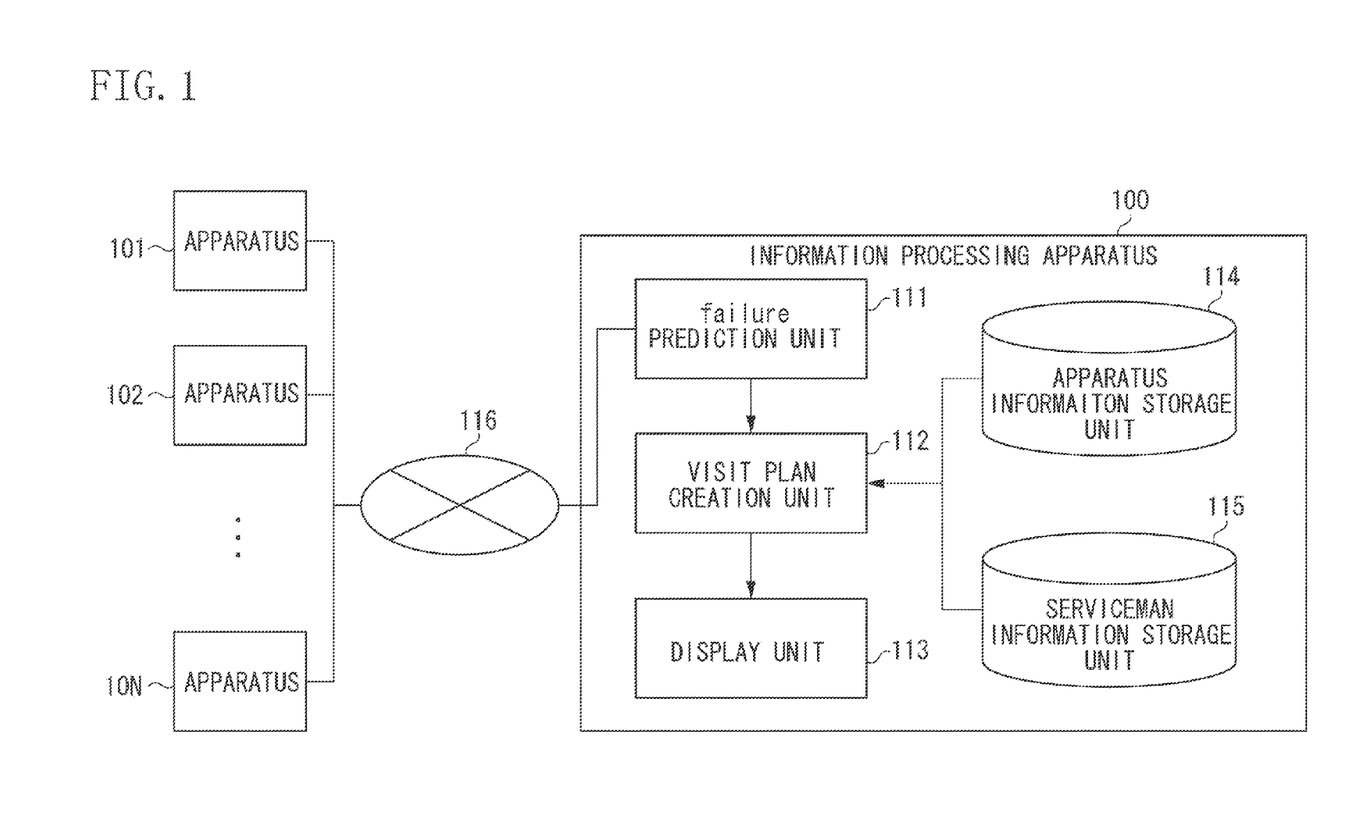
FIG. 1 is a block diagram illustrating a configuration of an information processing system according to a first exemplary embodiment.

FIG. 1 is a block diagram illustrating a configuration of an information processing system according to the present exemplary embodiment. Respective apparatuses 101 to 10N are N apparatuses installed at different positions, and are image forming apparatuses installed in a user's office, for example. The apparatuses are connected to an information processing apparatus 100 via a network 116.

The information processing apparatus 100 includes a failure prediction unit 111, a visit plan creation unit 112, a display unit 113, an apparatus information storage unit 114, and a serviceman information storage unit 115. The failure prediction unit 111 uses information about an internal state of each of the apparatuses 101 to 10N obtained via the network 116, to predict an occurrence of a failure in the apparatus. While a configuration in which the failure prediction unit 111 is included in the information processing apparatus 100 has been described in FIG. 1, the failure prediction unit 111 may be included in each of the apparatuses 101 to 10N. In this case, in each of the apparatuses 101 to 10N, a failure prediction is made from the information about the internal state, and a failure prediction result is transmitted to the information processing apparatus 100.

The visit plan creation unit 112 creates a visit plan of the serviceman based on the failure prediction result by the failure prediction unit 111 and respective pieces of information about the apparatus information storage unit 114 and the serviceman information storage unit 115. The apparatus information storage unit 114 stores information about an installation position of each of the apparatuses or information about a movement time and a movement distance between the apparatuses. The serviceman information storage unit 115 stores information about the serviceman engaged at a service deposit.

The display unit 113 displays the visit plan of the serviceman that has been created by the visit plan creation unit 112. Each of the servicemen visits each of the apparatuses according to the displayed visit plan. The information processing apparatus 100 may include an input/output device for a person to correct the visit plan displayed on the display unit 113.

The information processing apparatus 100 can implement software (a program) acquired via the network 116 or various types of information recording media using a calculator including a central processing unit (CPU), a memory, a storage device, an input/output device, a bus, and a display device. The calculator may include a general-purpose calculator, or may include hardware designed most appropriately for the program in aspects of the present invention.

Figure 2:
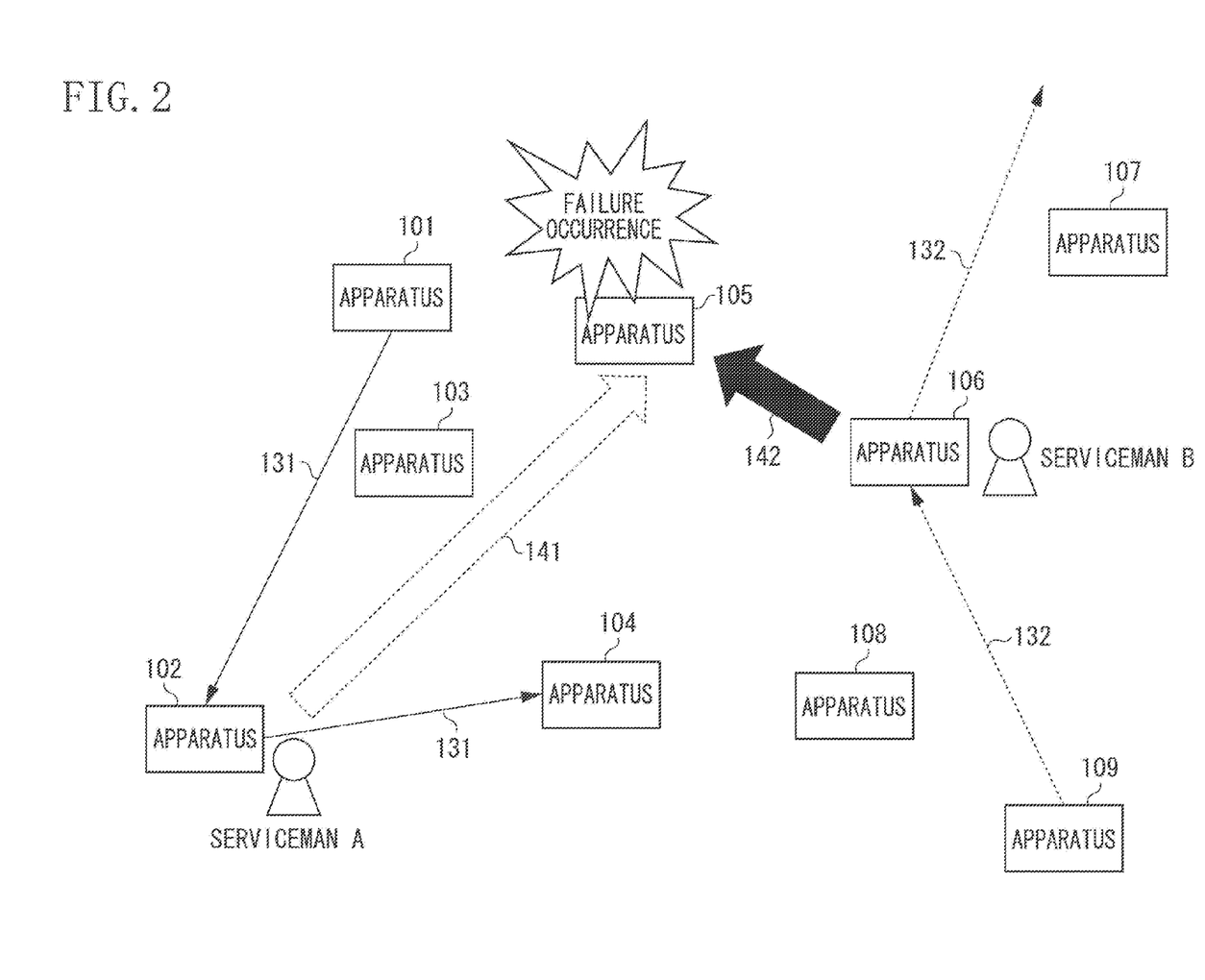
FIG. 2 is a schematic view illustrating the outline of a visit plan creating method according to the first exemplary embodiment.

The outline of a visit plan creating method according to the present exemplary embodiment will be described below with reference to FIG. 2. FIG. 2 illustrates a plurality of apparatuses 101 to 109 installed at respective different positions. An arrow 131 indicates a visit path following a visit plan of a serviceman A. The visit plan of the serviceman A is a plan to sequentially visit the apparatuses 101, 102, and 104. As apparatuses to be visited, the apparatuses 101, 102, and 104, which are high in the necessity of a regular visit, are at a replacement time of an end-of-life part, or are high in the probability of a failure occurrence, and need to be visited, have been selected.

The apparatus 105 is an apparatus that may fail with a relatively high probability, although excluded from a scheduled visit. If an unexpected failure occurs in the apparatus 105 so that the apparatus 105 becomes inoperative, a serviceman needs to be urgently called out based on a notification from a user of the apparatus 105 or automatic detection via the network 116. At this time, when a failure has occurred in the apparatus 105 while the serviceman A is visiting the apparatus 101, the serviceman A, who has received a notification, can move to the apparatus 105 in a relatively short time because the apparatus 101 and the apparatus 105 are installed relatively near to each other. On the other hand, when a failure has occurred in the apparatus 105 while the serviceman A is visiting the apparatus 102, it takes time for the serviceman A to move to the apparatus 105 (an arrow 141 in FIG. 2) because the apparatus 102 and the apparatus 105 are spaced apart from each other. Therefore, it takes time to deal with the failure. Thus, downtime of the apparatus 105 is lengthened, creating a significant disadvantage for the user of the apparatus 105.

A plurality of servicemen is generally engaged at one service deposit. The other serviceman also visits the apparatus according to a visit plan. In FIG. 2, a visit path following a visit plan of a serviceman B is indicated by a broken-line arrow 132. The visit plan of the serviceman B is a plan to sequentially visit the apparatuses 109 and 106. In a case illustrated in FIG. 2, the serviceman B plans to visit the apparatus 106 at a timing when the serviceman A is visiting the apparatus 102. The apparatus 105 and the apparatus 106 are installed at relatively near positions. Therefore, when a failure occurs in the apparatus 105 at this timing, the serviceman B can move to the apparatus 105 in a relatively short time. Therefore, downtime of the apparatus 105 can be shortened.

When it is assumed that a failure has occurred in the apparatus 105 at a timing when both the servicemen A and B are visiting respective positions far from the apparatus 105, it takes time to reach the apparatus 105. However, at a timing when either one of the servicemen A and B is visiting a position near to the apparatus 105, even if a failure occurs in the apparatus 105, the serviceman can move to the apparatus 105 in a relatively short time. Therefore, a visit plan for at least one of the plurality of servicemen to visit the vicinity of the apparatus that may fail with a relatively high probability, as often as possible is desirably created. In the present exemplary embodiment, a visit plan to deal with an unexpected failure is thus created. Therefore, a cost based on a failure prediction result and a distance between the apparatus excluded from a visit target and the serviceman nearest thereto is calculated, to create respective visit plans most appropriate for the plurality of servicemen. This cost is hereinafter referred to as an emergency response cost to be distinguished from other costs, and a specific visit plan creating method will be described.

A configuration of the failure prediction unit 111 and the visit plan creation unit 112 in the information processing apparatus 100 according to the present exemplary embodiment will be described below. The failure prediction unit 111 predicts the degree of an occurrence of a failure in each of apparatuses based on information about an internal state of the corresponding apparatus, and outputs the degree of the occurrence of the failure as a failure predicted value. If the apparatus is an image forming apparatus, for example, respective frequencies of jam generation and alarm generation, respective counter values of a pattern, the number of prints, and a drum rotation amount, or respective pieces of sensor information about a vibration sensor, a temperature sensor, and a current sensor in the image forming apparatus are collected as internal information about the internal state of the apparatus. The internal information is collated with a statistical pattern of the internal information before the failure, preliminarily collected, to calculate a failure predicted value. A method for calculating the failure predicted value can include a method discussed in Japanese Patent Application Laid-Open No. 2005-309077, for example. In the method discussed in Japanese Patent Application Laid-Open No. 2005-309077, a failure predicted value is calculated according to information about an internal state of an apparatus and a model of a Bayesian network previously prepared. The method for calculating the failure predicted value may use such a conventional technique, for example, and detailed description thereof is omitted.

In the present exemplary embodiment, one failure predicted value is obtained for each of the apparatuses. Therefore, when a failure predicted value is calculated for a failure occurrence for each of parts in the apparatus and a failure occurrence for each type of failure previously determined, the failure predicted value serving as a representative value is calculated from among the plurality of failure predicted values. In the present exemplary embodiment, when a plurality of failure prediction results such as a failure prediction result of each of the parts in the apparatus is obtained, their maximum value is set as a failure predicted value $v_n$ in an apparatus n. The failure predicted value $v_n$ indicates the probability with which a failure occurs in each of the apparatuses. Thus, the maximum value is preferably set. Not only the maximum value but also an average of the plurality of failure prediction results of the apparatus n may be set as the failure predicted value $v_n$. Alternatively, the failure predicted value $v_n$ may be obtained by another calculating method.

Processing performed by the visit plan creation unit 112 will be described below. The visit plan creation unit 112 creates a visit plan in a predetermined period, of each of a plurality of servicemen based on the failure predicted value $v_n$ output by the failure prediction unit 111 and information stored in the apparatus information storage unit 114 and the serviceman information storage unit 115. The failure predicted value $v_n$ predicted by the failure prediction unit 111 is obtained by predicting a failure occurrence in a period corresponding to the predetermined period of which the visit plan is created.

Information about the apparatuses 101 to 10N is previously stored in the apparatus information storage unit 114. The information stored in the apparatus information storage unit 114 is information about an identifier (ID) of an apparatus to be managed, a date and a time for the last visit, an installation position, and a distance between the apparatuses, for example, and the information about the apparatus is called from the visit plan creation unit 112, as needed. The serviceman information storage unit 115 stores information about a personnel code of the serviceman belonging to the service deposit and the apparatus taken charge of by the serviceman. Information about the serviceman is called from the visit plan creation unit 112, as needed.

Figure 4:
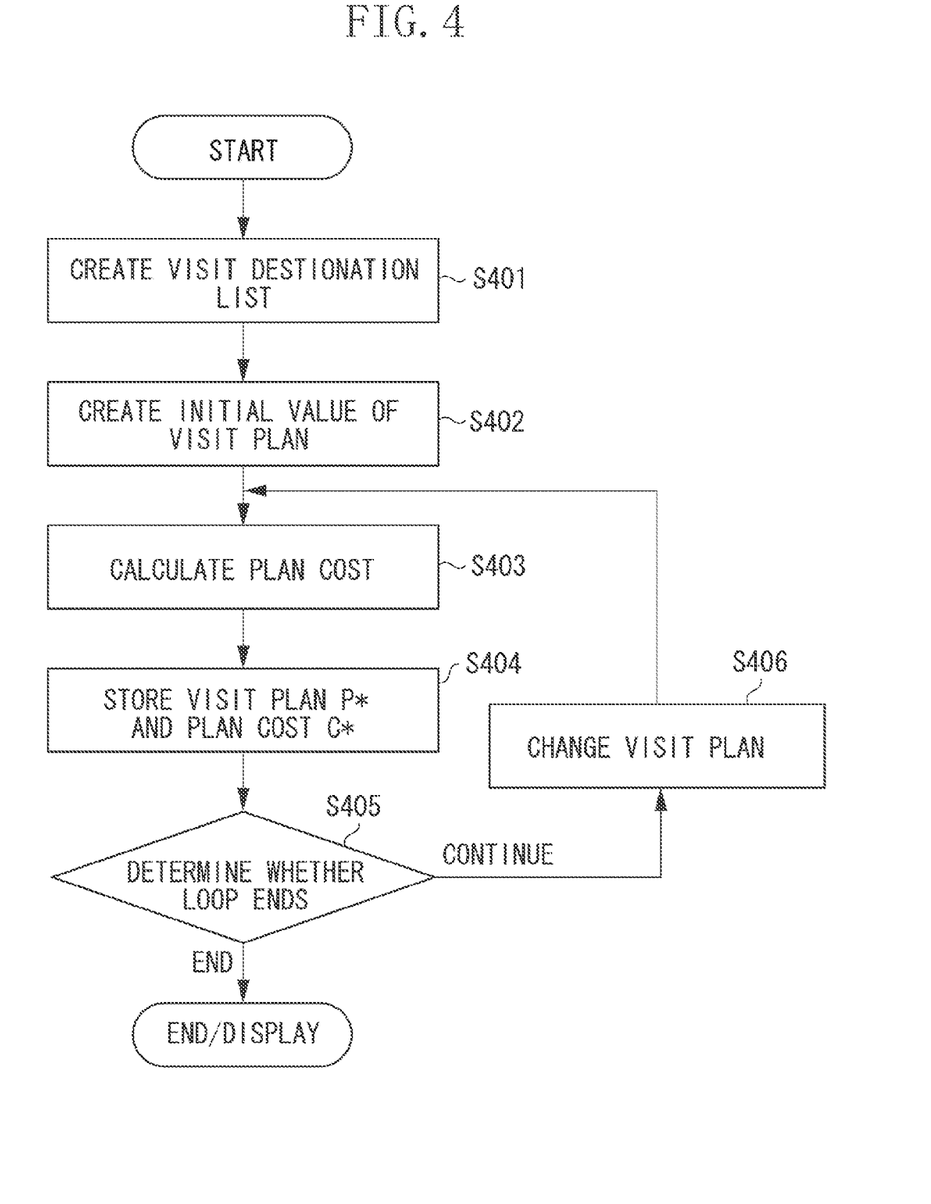
FIG. 4 is a flowchart illustrating processing for creating a visit plan in the first exemplary embodiment.

FIG. 4 is a flowchart illustrating processing for creating a visit plan to be executed by the visit plan creation unit 112 in the information processing apparatus 100. As illustrated in FIG. 4, the visit plan creation unit 112 is roughly divided into functions as a determination unit, a calculation unit, and a creation unit. More specifically, in step S401, the visit plan creation unit 112 determines an apparatus (a first type of apparatus) visited by a serviceman and an apparatus (a second type of apparatus) that is not visited by the serviceman to create a visit destination list, as the determination unit. In step S403, the visit plan creation unit 112 calculates a cost relating to the visit plan, as the calculation unit. In steps S403 to S406, the visit plan creation unit 112 creates a final visit plan, as the creation unit. Details of processing for creating the visit plan creating method to be executed by the visit plan creation unit 112 will be described below.

Figure 3:
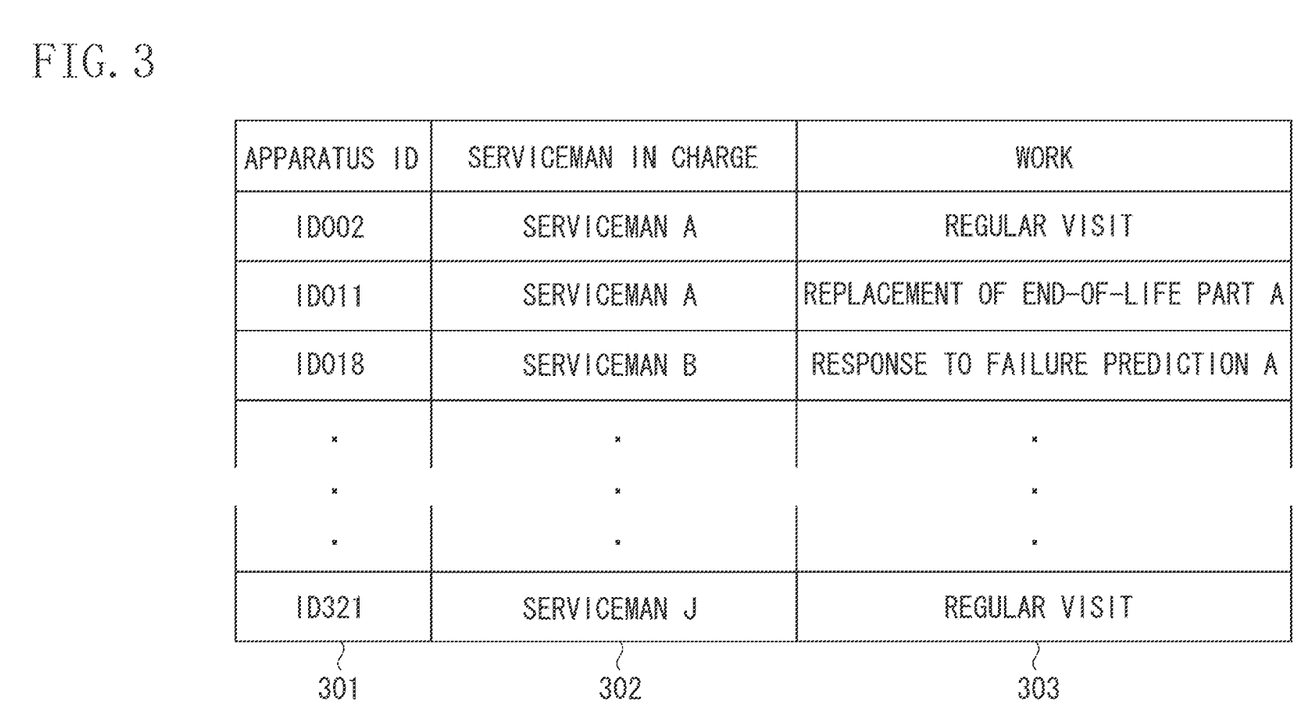
FIG. 3 illustrates a list of apparatuses to be visited in a visit plan period in the first exemplary embodiment.

First, in step S401, the visit plan creation unit 112 creates a list of visit destination apparatuses to be visited during a plan period. Candidates for the visit destination apparatuses are determined before the visit plan is created. In step S401, the visit plan creation unit 112 selects the apparatus to be actually visited from among the candidates for the visit destination apparatuses, to create the list of visit destination apparatuses. FIG. 3 illustrates a list of apparatuses to be visited during a visit plan period by a plurality of servicemen at a service deposit, which has been determined in step S401. The list of visit destination apparatuses illustrated in FIG. 3 contains an ID of a visit destination apparatus, a serviceman taking charge of each of apparatuses, and a reason for a visit or a measure during the visit. In step S401, the apparatus to be visited during the visit plan period is selected and determined, as follows, for example.

When the serviceman regularly visits the apparatus to be managed to clean the apparatus and confirm the apparatus in practice, the apparatus after an elapse of a predetermined period or more since the last visit is first selected as a visit target during the visit plan period. To select the apparatus, the apparatus information storage unit 114 stores a date and a time for the last visit to each of the apparatuses.

When the failure predicted value $v_n$ calculated by the failure prediction unit 111 represents a significantly high value, The probability that a failure occurs during the visit plan period is high. Therefore, it is preferable that a preliminary measure such as part replacement is performed before the failure occurs, to prevent the failure from occurring. In this case, if the failure predicted value $v_n$ calculated by the failure prediction unit 111 in an apparatus is a predetermined threshold value (first threshold value) or more, the apparatus is selected as an apparatus to be visited. The preliminary measure is to be a minimum requisite implementation because a part replacement cost or a work cost is generated. Therefore, a visit for the preliminary measure is implemented only for the apparatus in which the failure predicted value $v_n$ is the first threshold value or more.

Further, the day on which the part in the apparatus reaches the end of its life is predicted, besides a failure, and the part is replaced on or before the day. When the apparatus is an image forming apparatus, a toner and a drum are consumable parts, and are preferably replaced at an appropriate timing by predicting an end-of-life time. Therefore, if an end-of-life day of a consumable part in an apparatus is during a plan period, the apparatus is selected as a visit target. In step S401, the visit plan creation unit 112 selects a target apparatus to be visited during the visit plan period based on a regular visit period, a prediction of a failure, and a prediction of the life of the consumable part, as described above.

In step S402, an initial value of a visit plan (an initial arrangement in the order of visits to apparatuses) is then determined based on the list of visit destinations that has been created in step S401. Visit plans 501 and 502 illustrated in FIG. 5 indicate respective examples of initial values of the visit plans created for the servicemen A and B.

Each of the visit plans 501 and 502 contains apparatuses to be visited within five days and work performed by each of the apparatuses to be visited (a regular visit, a response to an apparatus that is predicted to fail with a high probability, and replacement of a part that reaches the end of its life). While a simple visit plan in which a time is divided into only morning (AM) and afternoon (PM) is illustrated to simplify description in each of the visit plans 501 and 502 illustrated in FIG. 5, the plan may be created by the hour, to assign respective visits to three or more apparatuses to one day.

While a method for determining the order of visits to apparatuses to be visited based on a visit destination list will be described below, the visit plan creation unit 112 optimizes a visit plan by repetitive processing. Therefore, an initial value of the visit plan may be basically any order. For example, the initial value of the visit plan may be created by arranging apparatuses described in a visit destination list at random in a visit plan period. Alternatively, the initial value of the visit plan may be created using a predetermined rule depending on a content of visit work. For an apparatus whose end-of-life day has been predicted by predicting the life of a part, an apparatus visit day is determined so that the apparatus is visited on the end-of-life day in an initial plan. For an apparatus that has been predicted to fail with a high probability in failure prediction processing, the initial value of the visit plan is created so that the apparatus is preferentially visited (e.g., one day after). Further, for the regular visit, a visit day and a visit time are also set to create an initial plan so that the larger the number of days elapsed since the last visit day is, the more preferentially the apparatus is visited. The initial value of the visit plan of each of the plurality of servicemen is created as described above.

In the subsequent steps S403 to S406, the visit plan creation unit 112 updates the respective visit plans of the plurality of servicemen from the initial values of the visit plans, to create a visit plan finally output by the information processing apparatus 100. The process in step S403 of calculating a plan cost will be described below. In step S403, the visit plan creation unit 112 calculates a visit cost of the input visit plan. Conventionally, it has been known that a most appropriate visit plan is created in consideration of a movement cost between the apparatuses, a maintenance cost, and a failure risk. In the present exemplary embodiment, to create a visit plan considering an urgent call-out, an emergency response cost is introduced in addition to the costs conventionally used. The costs change depending on the order of visits (visit plan) even if visit destination apparatuses are the same during a plan period. In the present exemplary embodiment, the visit plans in which the costs are minimized are selected so that the most appropriate visit plan can be determined. When C is an overall plan cost of visit plans of the plurality of servicemen, the plan cost C in the present exemplary embodiment is expressed by the following Equation 1:

$$C = \alpha C_d + \beta C_r + \gamma C_f + \delta C_e \ldots \quad \text{Equation 1,}$$

where $C_d$ is a movement cost, $C_r$ is a part replacement cost, $C_f$ is a failure risk, $C_e$ is an emergency response cost, and $\alpha$, $\beta$, $\gamma$, and $\delta$ are respective weight coefficients of the costs. Each of the costs is calculated as an overall cost of the plurality of servicemen. A method for calculating each of the costs when the visit plans of the plurality of servicemen are given will be described below.

The movement cost $C_d$ is a cost based on a movement distance when the serviceman moves between the apparatuses and between the service deposit and the apparatus according to the visit plan. The larger the movement distance is, the larger the movement cost $C_d$ becomes. In a visit plan in which the number of long-distance movements is large, a movement time becomes wasteful. Therefore, the visit plan is desirably a visit plan to make efficient movements to decrease the movement distance (for example, to visit near apparatuses as collectively as possible). The movement cost $C_d$ is calculated by the following Equation 2, for example:

$$C_d = \sum_j^J \sum_t^{T_j} D(j, t) \quad \text{Equation 2}$$

Here, J is the number of all servicemen, $T_j$ is an entire movement in a visit plan of a serviceman j, and t is one movement during the visit plan. D (j, t) represents a movement distance between the current visit destination apparatus and the subsequent visit destination apparatus in the movement t of the serviceman j, or represents a movement distance between the service deposit and the apparatus when the serviceman starts or returns from or to the service deposit at the start and the end of a one-day visit. Information about the movement distance between the apparatuses is previously stored in the apparatus information storage unit 114. The stored information about the movement distance may be stored by calculating a rectilinear distance based on information about an installation position of the apparatus and a position of the service deposit, or may be stored by calculating an actual movement distance along a path. Only information about the installation position of each of the apparatuses and the service deposit may be stored in the apparatus information storage unit 114, to calculate the movement distance between the apparatuses, as needed.

As described above, the movement distance is calculated by calculating the sum of movement distances for an entire movement T in a visit plan of a serviceman and all servicemen J, to calculate the movement cost $C_d$. While the movement cost $C_d$ has been calculated based on the movement distance, the movement cost $C_d$ may be calculated based on not the movement distance but a movement time. In this case, a movement time between the apparatuses may be previously stored in the apparatus information storage unit 114.

Then, the part replacement cost $C_r$ is a cost that rises if a part replacement day during a plan has shifted when a part whose end-of-life day (optimum replacement day) has been predicted is replaced. More specifically, if the end-of-life day has been predicted, the cost is minimized when the part is replaced on the end-of-life day. On the other hand, if the replacement day is set before the end-of-life day, the part is replaced without being completely consumed. Therefore, the earlier a scheduled replacement day is, the higher the cost becomes. If the part is replaced after the end-of-life day, the apparatus may fail or the operation thereof may be stopped. Therefore, the cost rapidly rises. The part replacement cost $C_r$ is calculated by the following Equation 3, for example:

$$C_r = \sum_j^J \sum_n^{N_{rj}} R(\text{day}(j, n)) \quad \text{Equation 3}$$

Figure 6:
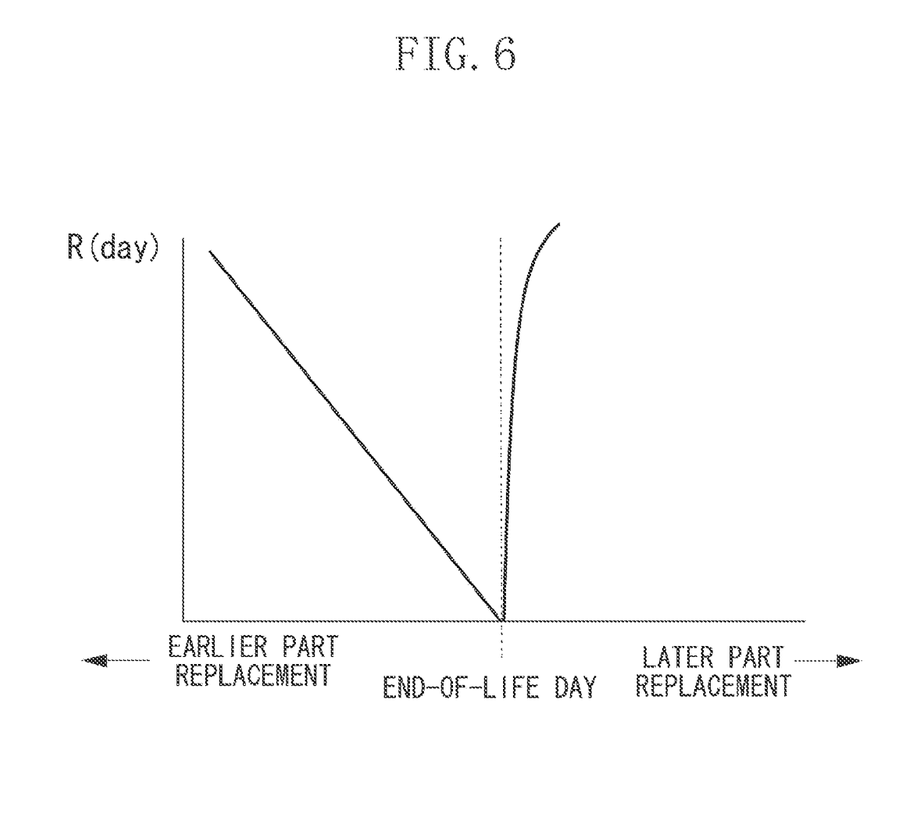
FIG. 6 illustrates a function relating to calculation of a part replacement cost $C_r$ in the first exemplary embodiment.

Here, J is the number of all servicemen, $N_{rj}$ is the number of apparatuses to be visited according to a part end-of-life prediction included in a visit plan of a serviceman j, and day (j, n) represents a day on which the serviceman j visits an apparatus n during the visit plan. R (day) is a function for returning a value depending on a shift from the end-of-life time when the day is input. FIG. 6 illustrates a function R (day) used to calculate the part replacement cost $C_r$. As illustrated in FIG. 6, R (day) returns a minimum value on the end-of-life day and returns a value that increases depending on a shift of the input day from the end-of-life day when the input day is earlier than the end-of-life day. On the other hand, R (day) returns a value that rapidly increases when the input day is later than the end-of-life day. The function is previously prepared for each part to be replaced, and is stored in the apparatus information storage unit 114. As described above, the part replacement cost $C_r$ is calculated by calculating the sum of R (day) for the number Nr of apparatuses each including an end-of-life part to be replaced during the visit plan of the serviceman j and all the servicemen J.

The failure risk $C_f$ will be described below. The above described part replacement cost $C_r$ is calculated as a cost based on a replacement time of an end-of-life part. On the other hand, the failure risk $C_f$ is calculated as a cost relating to visit days of apparatuses that are determined to be high in failure predicted value by failure prediction processing and listed in the visit destination list to preliminarily deal with a failure. The apparatus, which is predicted to fail, is to be quickly visited. Therefore, the later the visit day to the apparatus during the visit plan becomes, the higher a cost to be output becomes. The failure risk $C_f$ is calculated by the following Equation 4, for example:

$$C_f = \sum_j^J \sum_n^{N_{fj}} w_n(v_n) F(\text{day}(j, n)) \quad \text{Equation 4}$$

Here, J is the number of all servicemen, $N_{fj}$ is the number of apparatuses to be visited according to a failure prediction included in a visit plan of a serviceman j, and day (j, n) represents a day on which the serviceman j visits an apparatus n during the visit plan, like in the part replacement cost. F (day) is a function for returning a value that increases as an input day becomes later during the visit plan, and $w_n (v_n)$ is a weight based on the failure predicted value $v_n$ in the apparatus n. The later a visit to the apparatus in which the failure predicted value $v_n$ is large becomes, the higher the failure risk $C_f$ becomes. The functions are previously prepared for each type of failure to be predicted, and are stored in the apparatus information storage unit 114.

Further, in the present exemplary embodiment, as the emergency response cost $C_e$, a cost based on a distance between the apparatus in which the failure predicted value $v_n$ is relatively large and a visit position of the serviceman j is introduced. When the cost is used, a visit plan to enable quick movement to the apparatus that has unexpectedly failed can be created. In the present exemplary embodiment, an apparatus in which a failure predicted value $v_n$ is very high (an apparatus in which a failure predicted value $v_n$ is a first threshold value or more) is an apparatus to be visited. On the other hand, if the apparatus, which is excluded from a visit target but may fail with a relatively high probability, exists, a visit plan particularly considering an urgent call-out to the apparatus among the apparatuses excluded from a visit target is preferably created. The apparatus, which may fail with a relatively high probability, is an apparatus in which a failure predicted value $v_n$ is less than the first threshold value and a second threshold value or more, for example (the first threshold value is larger than the second threshold value). Therefore, the emergency response cost $C_e$ particularly corresponds to a case where a failure has occurred in the apparatus that is excluded from a visit target but may fail with a relatively high probability. Therefore, the apparatus is weighted based on the failure predicted value $v_n$.

A specific example of a method for calculating the emergency response cost $C_e$ is as follows. First, a movement distance between a position of the apparatus excluded from a visit plan in a time slot in the visit plan and a position of the serviceman who is visiting a position nearest thereto is weighted based on the failure predicted value $v_n$. For all the apparatuses excluded from the visit plan and all times in the visit plan, the sum of values of the weighted movement distances is calculated, to calculate the emergency response cost $C_e$. The emergency response cost $C_e$ is calculated by the following Equation 5, for example:

$$C_e = \sum_m^M \sum_n^{N_o} w_n(v_n) \min_{j \in J} |p_n - p_{mj}| \qquad \text{Equation 5}$$

Here, m is a time slot in the visit plan. In an example of the visit plan illustrated in FIG. 5, for example, m=1 is a time slot "AM one day after". M represents all times in a visit plan to be created. More specifically, in calculation of the emergency response cost $C_e$, values, described below, are calculated for each hour in the visit plan, and the sum in the visit plan is calculated. $N_o$ is the apparatus excluded from the visit plan that is not included in the visit plan among all the apparatuses N to be managed, $w_n (v_n)$ is a weight based on the failure predicted value v of the apparatus n, like in Equation 4, $p_n$ is a position of the apparatus n, $p_{mj}$ is a position (a visit plan position) of the apparatus which the serviceman j is visiting in a time slot m in the visit plan, and $\min|P_n - P_{mj}|$ represents a distance between the position $p_n$ of the apparatus n excluded from the visit plan and the position $p_{mj}$ of the serviceman j who is visiting a position nearest thereto in the time slot m. This distance may be a rectilinear distance or an actual movement distance. Information for calculating the distances is stored in the apparatus information storage unit 114, like information for calculating a movement cost. This distance may be not based on the movement distance but based on a movement time, like in the movement cost. While a distance between the position $p_n$ of the apparatus and the position $p_{mj}$ of the nearest serviceman is calculated in the foregoing Equation 5, this is not limited to the nearest serviceman. Respective distances between the position $P_n$ of the apparatus n and x servicemen nearest thereto may be calculated, and an emergency response cost $C_e$ may be calculated based on their average.

When the emergency response cost $C_e$ is thus calculated, a cost, which represents a high value when the serviceman, who is visiting the vicinity of the apparatus that may fail with a relatively high probability, does not exist (when a distance from the nearest serviceman is far) is obtained.

When each of the costs is calculated as described above, and the sum of respective weighted costs is calculated by Equation 1, the respective plan costs C of the visit plans by the plurality of servicemen are calculated. When the visit plans to minimize the plan cists C are obtained, the visit plans by the plurality of servicemen can be optimized. In the present exemplary embodiment, the visit destination is determined based on the visit destination list. Therefore, the order of visits to the apparatuses is replaced, to obtain the visit plans to minimize the plan costs C. This becomes a combination optimization problem. Thus, a strict solution is not easily obtained. Therefore, in the present exemplary embodiment, an approximate solution is obtained using a local search method, as described below.

A loop of steps S403, S404, S405, and S406 illustrated in FIG. 4 is a repetitive step for obtaining an approximate solution using a local search method. In step S403, the visit plan creation unit 112 calculates a plan cost C represented by an initial value of a visit plan in a first loop. In step S404, the visit plan creation unit 112 then stores a current visit plan P (an initial value of the visit plan P) and the plan cost C as a visit plan P* and a plan cost C*, respectively, and the processing proceeds to step S405. In step S405, the visit plan creation unit 112 determines whether the loop ends. In the first loop, the loop does not end. The end determination will be described below.

In step S406, the visit plan creation unit 112 replaces a part of the visit plan, to create a new visit plan (a neighborhood solution in a local search method). The replacement of a part of the visit plan is replacement of the order of visits by a serviceman, as indicated by an arrow 511 in FIG. 5, for example. The arrow 511 illustrated in FIG. 5 indicates that a visit destination apparatus in AM two days after and a visit destination apparatus in PM three days after by the serviceman B are replaced with each other, to create a new visit plan. In the present exemplary embodiment, the apparatus taken charge of by each of the servicemen is determined. Therefore, the order of visits is replaced only during the visit plan of each of the servicemen. On the other hand, if all the servicemen take charge of the apparatuses at the service deposit without setting the apparatus in charge specific to each of the servicemen, the visit plans by the different servicemen may be replaced. A new visit plan may be created by replacing a visit destination apparatus by the serviceman A and a visit destination apparatus by the serviceman B with each other, as indicated by an arrow 512 in FIG. 5. Replacement of the visit destination apparatuses to be simultaneously replaced may be replacement of a pair of visit destination apparatuses, as described above, or may be simultaneous replacement of the orders of visits to three or more visit destination apparatuses.

If a part of the visit plan is replaced to create a new visit plan in step S406, the processing returns to step S403 again. In step S403, the visit plan creation unit 112 calculates a plan cost C of the new visit plan. Further, the processing proceeds to step S404. In step S404, the visit plan creation unit 112 determines whether the new visit plan and the plan cost C are respectively replaced with the visit plan P* and the plan cost C* that are stored as current solutions. In this processing, the plan cost C of the new visit plan and the stored plan cost C* are compared with each other. If the plan cost C of the new visit plan is lower than the plan cost C*, the new visit plan and the new plan cost C are respectively replaced with the visit plan P* and the plan cost C*, and the visit plan P* and the plan cost C* are stored. If the plan cost C of the new visit plan is higher than the plan cost C*, the new visit plan and the new plan cost C are not respectively replaced with the visit plan P* and the plan cost C*, and the processing ends.

The foregoing loop is implemented until an end condition in step S405 is satisfied, to update the visit plan P*. In the end determination in step S405, a case where the visit plan P* has not been updated even if the loop is repeated and a case where the loop has been implemented a predetermined number of times are considered as the end condition, to perform the end determination. When it is determined that the loop ends, the stored visit plan P* becomes a visit plan to be finally output.

In the end determination in step S405, an end determination condition considering a value of the plan cost C* may be added. In this case, if the plan cost C* is a low cost that is a predetermined threshold value or less, it is determined that the loop ends regardless of the number of times of the loop. According to the processing, if the initial value of the visit plan represents a significantly low plan cost, the initial value of the visit plan is directly output as a final visit plan.

Figure 5:
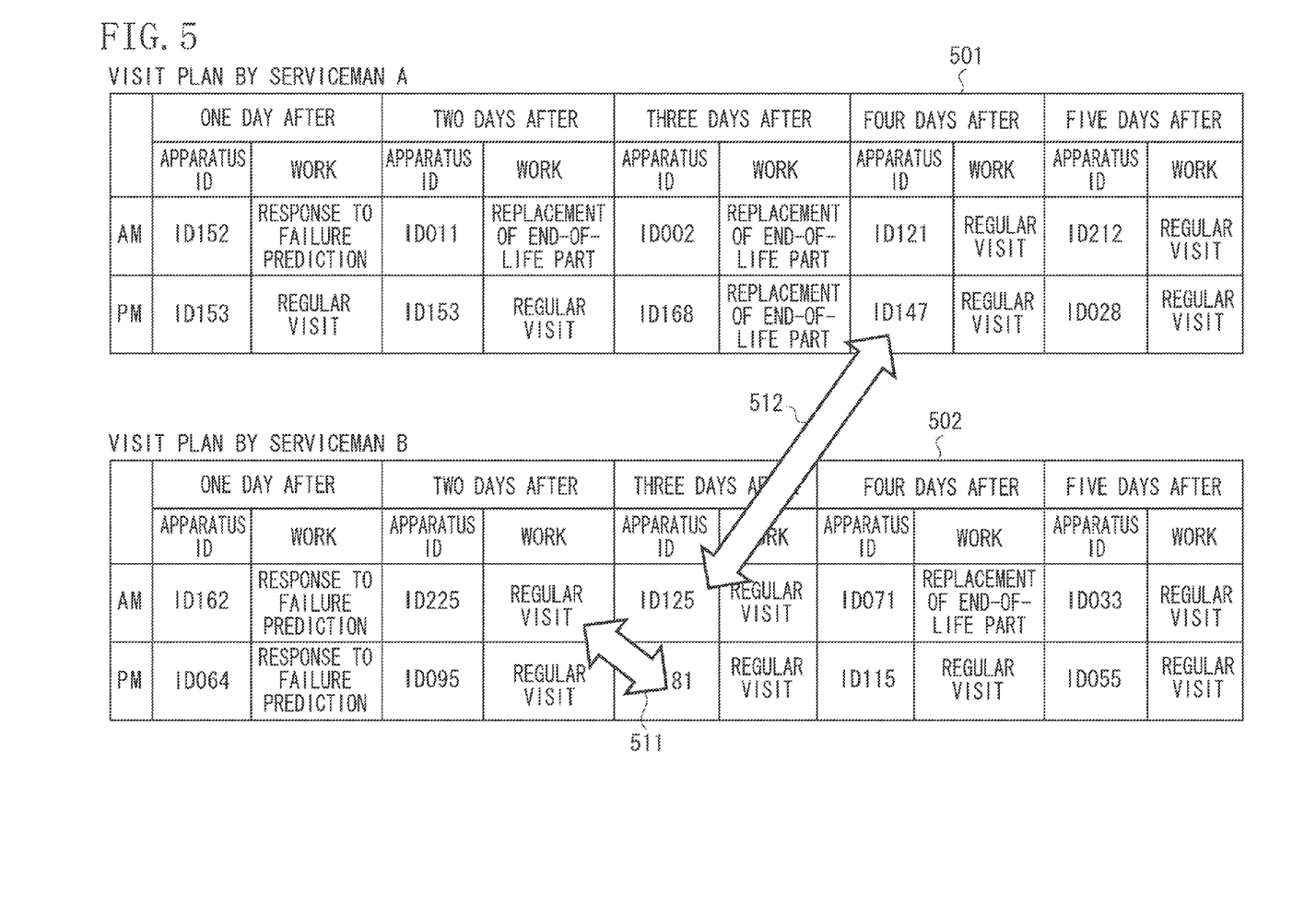
FIG. 5 illustrates a visit plan determined in the first exemplary embodiment.

A visit plan created by the foregoing processing is displayed on the display unit 113. Each of the servicemen confirms the displayed visit plan, and visits an apparatus. The visit plan of each of servicemen may be displayed on the display unit 113, as illustrated in FIG. 5. The information processing apparatus 100 according to aspects of the present invention may include an input/output device for causing a person to change and correct an output visit plan, as needed.

Information representing various types of costs of the visit plan, together with the output visit plan, may be displayed. Particularly for display of an emergency response cost, display, described below, for example, may be performed. First, during a visit plan displayed, as illustrated in FIG. 5, a time slot in which an emergency response cost is high may be emphasized and displayed. Such display enables a time slot in which it takes time for an urgent movement caused by a failure occurrence during the visit plan, to be grasped. Alternatively, a position of each of servicemen in a time slot in the visit plan and a position of an apparatus may be displayed on a map, and an apparatus in which a failure predicted value is high, a serviceman nearest thereto, and a movement cost may be together displayed thereon. The serviceman who visits the apparatus according to the visit plan can perform determination such as a request for support from another service deposit in a time slot in which an emergency response is difficult based on the information.

As described above, the information processing apparatus 100 according to the present exemplary embodiment creates respective visit plans by a plurality of servicemen in consideration of an emergency response cost. Thus, a visit plan in which at least one of the plurality of servicemen is visiting the vicinity of an apparatus in which a failure predicted value is high can be created. As a result, a movement time for an urgent call-out caused by a failure occurrence can be shortened so that downtime of the apparatus can be reduced.

[Modification to First Exemplary Embodiment]

In the first exemplary embodiment, a form in which a visit plan is created using a movement cost, a part replacement cost, and a failure risk as costs other than an emergency response cost has been described. The movement cost, the part replacement cost, and the failure risk may be calculated using methods other than the above described method. Alternatively, all the costs need not be calculated.

A cost other than the costs may be introduced into a plan cost. For example, a visit period interval cost based on an elapsed time since the last visit may be introduced for an apparatus to be regularly visited. The longer the visit period interval of the apparatus to be visited becomes, the more the visit period interval cost rises. The visit period interval cost is adjusted to preferentially (early) visit an apparatus after an elapse of a long period of time since the last visit.

In the above description, a method for calculating an emergency response cost based on a distance between a position of a serviceman and an apparatus excluded from a visit plan has been described. A target for which an emergency response cost is to be calculated is not limited to this. The emergency response cost, including a distance between an apparatus included in the visit plan and the position of the serviceman, may be calculated. In this case, for an apparatus n scheduled to be visited, a failure predicted value $v_n$ may be set to zero as being already responded to after a scheduled visit time, to calculate the subsequent plan costs.

Further, while processing using a local search method has been described as a method for obtaining an approximate solution of a plan cost, a method for calculating the approximate solution is not limited to this. As another calculating method, a genetic algorithm can be used, for example. In the genetic algorithm, the degree of compatibility is calculated from a plan cost C, described above, and the order of visits during a visit plan is set as a gene in order presentation. For example, a visit plan representing a minimum value may be calculated so that the plan cost C is represented by a quadratic.

A second exemplary embodiment of the present invention will be described below. In the first exemplary embodiment, an emergency response cost $C_e$ is calculated from a distance between an apparatus that is excluded from a visit plan and may fail with the relatively high probability and a serviceman nearest thereto. On the other hand, in the present exemplary embodiment, a configuration in which an emergency response cost $C_e$ is calculated will be described in consideration of a characteristic of a serviceman nearest to an apparatus that may fail with a relatively high probability. Components already described in the first exemplary embodiment are assigned the same reference numerals, and hence description thereof is not repeated.

When a failure has occurred in an apparatus excluded from a visit plan so that an urgent response has been required, a serviceman who is urgently called out is desirably a skilled person capable of dealing with the failure. If the serviceman is the skilled person, a period of time required to repair the failure is shortened so that downtime of the apparatus can be expected to be shortened. Therefore, in the present exemplary embodiment, a visit plan by which the serviceman serving as the skilled person preferentially visits an apparatus near an apparatus that may fail with a relatively high probability is created. An emergency response cost $C_e$ in the present exemplary embodiment is calculated by the following Equation 6:

$$C_e = \sum_m^M \sum_n^{N_o} w_n(v_n) \min_{j \in J}(|p_n - p_{mj}| - S_j) \quad \text{Equation 6}$$

Figure 7:
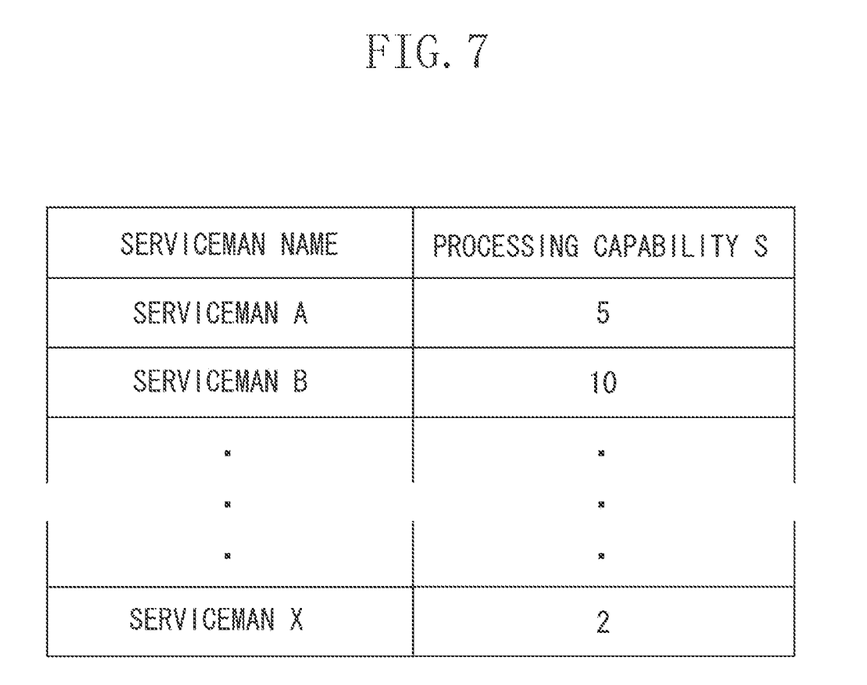
FIG. 7 illustrates characteristic information about each of servicemen in a second exemplary embodiment.

The emergency response cost $C_e$ (Equation 6) differs from the emergency response cost $C_e$ (Equation 5) in the first exemplary embodiment in that a term of a processing capability $S_j$ of a serviceman j is introduced. The processing capability $S_j$ of each of servicemen is previously quantified, as illustrated in FIG. 7, for example, and is stored in a serviceman information storage unit 115. The more skilled the serviceman j is, the higher the processing capability $S_j$ of the serviceman j is. Therefore, when the serviceman serving as the skilled person is selected as a serviceman nearest to an apparatus n, the emergency response cost $C_e$ decreases in Equation 6. When a plan cost C is created from the emergency response cost $C_e$, and a visit plan to reduce the plan cost C is created, a visit plan in which the skilled person tends to make an emergency response can be created.

A third exemplary embodiment of the present invention will be described below. In the second exemplary embodiment, when an emergency response is generated, an emergency response cost $C_e$ is calculated in consideration of a characteristic of a serviceman nearest to an apparatus that may fail with a relatively high probability so that a serviceman, who is as skilled as possible, can deal therewith. In such a configuration according to the second exemplary embodiment, a measure to a failure is earlier made so that a user of an apparatus has a great advantage. However, respective loads on some of the skilled servicemen tend to increase. In the present exemplary embodiment, a configuration in which a visit plan to equalize the possibility that a plurality of servicemen urgently responds to a failure as much as possible so that respective loads on the plurality of servicemen become equal is created will be described. Components already described in the first and second exemplary embodiments are assigned the same reference numerals, and hence description thereof is not repeated.

In the present exemplary embodiment, a visit plan to count the number of times each of servicemen is selected as a serviceman nearest to an apparatus excluded from a visit plan and introduce a variation in the number of times into a plan cost so that the number of times the serviceman is selected as the nearest serviceman is equalized is created. Therefore, an emergency response cost $C_e$ is first calculated by the foregoing Equation 5. The number of times a serviceman j is selected as a serviceman nearest to the apparatus excluded from the visit plan is counted. When $x_j$ is the number of times the serviceman j is selected as the nearest serviceman, a cost $C_s$ representing a variation in a load on the serviceman can be represented by a dispersion of $x_j$, as expressed by the following Equation 7:

$$C_s = \frac{1}{J} \sum_j^J (\bar{x} - x_j)^2 \quad \text{Equation 7}$$

Here J is the number of all servicemen. A visit plan to reduce a visit plan cost C is created by introducing the load cost $C_s$ into the plan cost C. In the present exemplary embodiment, the plan cost C is calculated, as expressed by the following Equation 8:

$$C = \alpha C_d + \beta C_r + \gamma C_f + \delta C_e + \varepsilon C_s \ldots \quad \text{Equation 8}$$

When the visit plan is thus created, the possibility of an emergency response can be relatively equally assigned to the plurality of servicemen. To further equalize the possibility of the emergency response, a failure predicted value $v_n$ in the nearest apparatus may be used. While $x_j$ is the number of times each of the servicemen is assigned to the nearest apparatus in the above description, $x_j$ is the sum of respective failure predicted values of the nearest apparatuses of the servicemen in this case. The visit plan cost C may be calculated using a dispersion of $x_j$ as the load cost $C_s$, like in the above description.

A fourth exemplary embodiment of the present invention will be described below. In the first exemplary embodiment, the failure prediction unit 111 selects, when a plurality of failure predictions (failure predictions of a plurality of parts or failure predictions of a plurality of different failures) is implemented in each of apparatuses, a maximum failure predicted value, to set a failure predicted value $v_n$ in an apparatus n. In calculation of the subsequent plan cost, the failure predicted value $v_n$ is used to weight various types of costs. On the other hand, in the present exemplary embodiment, a configuration in which an emergency response cost is weighted depending on a failure type represented by a maximum failure predicted value predicted by each of apparatuses will be described. The present exemplary embodiment aims at giving priority, when the probability of an occurrence of a failure, which takes time to repair, is high, to an arrangement of a serviceman near an apparatus that may fail so that downtime of the apparatus becomes long by increasing a weight on the apparatus. Components already described in the first to third exemplary embodiments are assigned the same reference numerals, and hence description thereof is not repeated.

In the present exemplary embodiment, for a plurality of failure types predicted by a failure prediction unit 111, a work time required to repair and deal with each of the failure types is previously stored in an apparatus information storage unit 114. As the work time of each of the failure types, an average of work times of work implemented in the past has been recorded. The failure prediction unit 111 calculates respective failure predicted values of the plurality of types of failures for an apparatus n, and sets the maximum failure predicted value as $v_n$ like in the first exemplary embodiment. A failure type label representing the maximum failure predicted value $v_n$ at that time is represented by $L_n$. An emergency response cost $C_e$ using $v_n$ and $L_n$ is calculated by the following Equation 9:

$$C_e = \sum_m^M \sum_n^{N_o} w_n(v_n, L_n) \min_{j \in J} |p_n - p_{mj}| \quad \text{Equation 9}$$

A function $w_n(v_n, L_n)$ is a function for calculating a weight based on the failure predicted value $v_n$ in the apparatus n and the failure type label $L_n$. A work time assumed from the failure type label $L_n$ and information in the apparatus information storage unit 114 is obtained, and a weight is calculated from the work time and the failure predicted value $v_n$. In the present exemplary embodiment, when the emergency response cost $C_e$ is thus calculated, a visit plan can be created so that a serviceman is arranged near the apparatus, which is assumed to require long work time, when a failure occurs.

A fifth exemplary embodiment of the present invention will be described below. While a configuration in which respective visit plans by a plurality of servicemen are simultaneously created has been described in each of the above described exemplary embodiments, a visit plan of one serviceman may be created. While a configuration in which a visit destination list is previously created and a visit plan is created with a visit destination apparatus during a plan period determined has been described in each of the above described exemplary embodiments, selection of the visit destination apparatus and creation of the visit plan may be simultaneously implemented. In the present exemplary embodiment, a configuration in which a visit plan of one serviceman is created while a visit destination apparatus is selected will be described. Components already described in the first to fourth exemplary embodiments are assigned the same reference numerals, and hence description thereof is not repeated.

In the first exemplary embodiment, a visit plan has been changed by replacing the order of visits in an existing visit plan in plan changing processing in step S406 illustrated in FIG. 4. In the present exemplary embodiment, not only replacement of the order of visits in an existing visit plan but also selection of an apparatus to be visited during a visit plan period is performed. For this processing, a list of apparatuses excluded from a visit target, which are not included in the visit plan, has been prepared. The list of apparatuses excluded from a visit target is a list of apparatuses in which a failure predicted values $v_n$ is less than a first threshold value.

In plan changing processing in the present exemplary embodiment, a visit destination apparatus in the existing visit plan and the apparatus on the list of apparatuses excluded from a visit target are replaced with each other, to create a new visit plan. In addition thereto, a plan cost of a new visit plan is calculated, to create a visit plan whose plan cost decreases, like in the first exemplary embodiment. Processing for selecting (replacing) the visit destination apparatus may be implemented simultaneously with processing for replacing the order of visits in the existing visit plan. Alternatively, any processing may be selectively executed. The apparatus to be visited, which has been set based on a failure prediction result and a life prediction result, needs to be visited during a plan period. Therefore, the visit destination apparatus, which is excluded from the existing visit plan, may be limited to an apparatus to be regularly visited by processing for replacing the apparatus to be visited.

In the present exemplary embodiment, a plan cost C is calculated as follows. First, a movement cost $C_d$, a part replacement cost $C_r$, and a failure risk $C_f$ are costs for one serviceman unless the sum of costs for a plurality of servicemen is calculated in each of Equation 2 to Equation 4 in the first exemplary embodiment. On the other hand, in Equation 5 for calculating an emergency response cost $C_e$, the nearest serviceman is selected from the plurality of servicemen for the apparatus n excluded from the visit plan. When the emergency response cost $C_e$ for a plurality of servicemen is changed into an emergency response cost $C_e$ for one serviceman, the emergency response cost $C_e$ is expressed by the following Equation 10:

$$C_e = \sum_m^M \sum_n^{N_O} w_n(v_n)|p_n - p_m| \quad \text{Equation 10}$$

Here, $|P_n-P_m|$ represents a movement distance between a position $p_n$ of the apparatus n excluded from the visit plan and a position $p_n$ of the visit destination apparatus of the serviceman at a time m. In the present exemplary embodiment, the plan cost C is calculated from the emergency response cost $C_e$ thus calculated from Equation 10 and the above described other costs. A visit plan is created so that the plan cost C decreases. Thus, in the present exemplary embodiment, a visit plan to set the apparatus, which is as near as possible to the apparatus in which the failure predicted value $v_n$ is high, excluded from the visit plan, as a visit destination can be created for a specific one serviceman.

A sixth exemplary embodiment of the present invention will be described below. In each of the above described exemplary embodiments, a configuration in which processing for weighting an emergency response cost $C_e$ based on a failure predicted value $v_n$ calculated by the failure prediction unit 111 is performed to create the visit plan to arrange a serviceman near an apparatus that may fail with a relatively high probability has been described. On the other hand, in the present exemplary embodiment, an emergency response cost $C_e$ is not weighted based on a failure predicted value $v_n$ when calculated. Components already described in the first to fifth exemplary embodiments are assigned the same reference numerals, and hence description thereof is not repeated.

In Equation 5 for calculating the emergency response cost $C_e$, the emergency response cost $C_e$ is calculated by the following Equation 11 when a weight $w_n$ ($v_n$) based on the failure predicted value $v_n$ is excluded.

$$C_e = \sum_m^M \sum_n^{N_O} \min_{j \in J}|p_n - p_{mj}| \quad \text{Equation 11}$$

In Equation 11, the weight $w_n$ ($v_n$) based on the failure predicted value $v_n$ is excluded. Thus, in a visit plan created using the emergency response cost $C_e$ to be calculated, servicemen are equally arranged for all apparatuses excluded from a visit target.

Weighting processing may be performed according to an elapsed time since the last visit instead of the weighting based on the failure predicted value $v_n$. This example aims at creating a visit plan so that a serviceman exists as near as possible, assuming that the apparatus after an elapse of a long period of time since the last visit, may fail with a high probability. If the emergency response cost $C_e$ is calculated in consideration of an elapsed time since the last visit, when $i_n$ is an elapsed time since the last visit of an apparatus n, the emergency response cost $C_e$ can be calculated by the following Equation 12:

$$C_e = \sum_m^M \sum_n^{N_O} I(i_n)\min_{j \in J}|p_n - p_{mj}| \quad \text{Equation 12}$$

Here, I ($i_n$) is a function for calculating a weight based on the elapsed time $i_n$. The longer the elapsed time since the last visit is, the larger a value to be returned as a weight is. In a visit plan created using the emergency response cost $C_e$, a serviceman exists near an apparatus after an elapse of a long period of time since the last visit.

As described above, in the present exemplary embodiment, a visit plan not to perform processing for weighting the emergency response cost $C_e$ based on the failure predicted value $v_n$ in calculating the emergency response cost $C_e$ so that servicemen are equally arranged for all the apparatuses excluded from a visit target is created. When the weighting processing is performed according to an elapsed time since the last visit instead of the failure predicted value $v_n$, the visit plan can be created so that the serviceman exists near the apparatus after an elapse of a long period of time since the last visit.

According to the above described configuration, a visit plan capable of also responding to an urgent call-out caused by a failure occurrence can be created in aspects of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-102818, filed May 20, 2015, which is hereby incorporated by reference herein in its entirety.

What is claimed is:

1. An information processing apparatus comprising:
at least one memory storing instructions; and
at least one processor that, upon execution of the instructions, configures the at least one processor to acquire, from one or more sensors in each of a plurality of apparatuses installed at different locations, data indicative of an operation status of each of the plurality of apparatuses serviceable by a plurality of servicemen; and
determine, based on the data acquired from the one or more sensors in each of the plurality of apparatuses meeting a condition, that an apparatus of the plurality of apparatuses is a first type of apparatus requiring a scheduled prioritized visit by any one of the plurality of serviceman within a predetermined period and that an apparatus of the plurality of apparatuses is a second type of apparatus when the condition is not met,
determine, for each of the second types of apparatuses based on the data acquired from the one or more sensors, a likelihood value that the second apparatus will require an unscheduled prioritized visit;
determine, a distance relationship between each of the first types of apparatuses and each of the second types of apparatuses based on an obtained physical location between each first type of apparatus and each second type of apparatus;
generate, a visit order for each of the first type of apparatuses during the predetermined period,
based on the determined distance relationship between second types of apparatuses having a likelihood value exceeding a predetermined threshold and each of the first types of apparatuses.

2. The information processing apparatus according to claim 1, wherein execution of the instructions further configures the at least one processor to calculate a cost relating to the visit order for each time slot in the predetermined period,
wherein the a value of the calculated cost is larger as a minimum distance between a location of the second type of apparatus and respective locations of the first type of apparatuses scheduled to be visited by the servicemen according to the generated visit order is greater than when the minimum distance is smaller;
wherein the visit order is generated by minimizing the calculated cost.

3. The information processing apparatus according to claim 2,
wherein execution of the instructions further configures the at least one processor to weight the cost based on a degree of a failure occurrence in each of the plurality of second type of apparatuses predicted based on the acquired data indicative of the operation status.

4. The information processing apparatus according to claim 2, wherein execution of the instructions further configures the at least one processor to calculate a movement cost based on a movement distance or a movement time when a serviceman visits an apparatus, in such a manner that the movement cost becomes the larger the longer the movement distance is or the movement cost becomes the larger the longer the movement time is, and adds the movement cost to the cost.

5. The information processing apparatus according to claim 2, wherein execution of the instructions further configures the at least one processor to calculate the cost based on a cost relating to movement of each of the plurality of servicemen, a cost relating to part replacement in at least one of the plurality of apparatuses, and a cost relating to a failure risk in the at least one of the plurality of apparatuses.

6. The information processing apparatus according to claim 2, wherein execution of the instructions further configures the at least one processor to predict a degree of an occurrence of a failure in each of the plurality of apparatuses based on the acquired data indicative of an operation status of each of the plurality of apparatuses,
   wherein a predicted degree of occurrence of a failure each of the first type of apparatuses is is greater than or equal to a first threshold value and a predicted degree of occurrence of a failure of the second type of apparatus is less than the first threshold value and is greater than or equal to a second threshold value, which is less than the first threshold value,
   wherein the visit order is generated so that the plurality of servicemen preferentially visits the first type of apparatus.

7. The information processing apparatus according to claim 6, wherein execution of the instructions further configures the at least one processor to select, as the serviceman nearest to the second type of apparatus, among the plurality of servicemen visiting the first type of apparatuses, according to the generated visit order, who is currently visiting the first type of apparatus closest to the location of the second type of apparatus, and calculates the cost based on a number of times each of the plurality of servicemen is selected as the serviceman nearest to the second type of apparatus.

8. The information processing apparatus according to claim 6, wherein execution of the instructions further configures the at least one processor to calculate the cost based on a length of a work time required for recovery from a failure in the second type of apparatus by each of the plurality of servicemen, in such a manner that the cost is calculated to be a larger value the longer the work time.

9. The information processing apparatus according to claim 1, wherein at least one of the plurality of apparatuses is an image forming apparatus, and the data acquired from the one or more sensors includes data indicative of one or more of respective frequencies of jam generation and alarm generation, respective counter values of a pattern, the number of prints, and a drum rotation amount.

10. An information processing method by an information processing apparatus, comprising:
   acquiring, from one or more sensors in each of a plurality of apparatuses installed at different locations, data indicative of an operation status of each of the plurality of apparatuses taken serviceable by a plurality of servicemen;
   determining, based on data acquired from the one or sensors in each of the plurality of apparatuses meeting a condition, that an apparatus of the plurality of apparatuses is a first type of apparatus requiring a scheduled prioritized visit by any one of the plurality of serviceman within a predetermined period and that an apparatus of the plurality of apparatuses is a second type of apparatus when the condition is not met,
   determining, for each of the second types of apparatuses based on the data acquired from the one or more sensors, a likelihood value that the second apparatus will require an unscheduled prioritized visit;
   determining, a distance relationship between each of the first type of apparatuses and each of the second type of apparatuses based on an obtained physical location between each of the first type of apparatuses and each of the second types of apparatuses; and
   generate a visit order for each of the first type of apparatuses during a predetermined period based on
   the determined distance relationship between second types of apparatuses having a likelihood value exceeding a predetermined threshold and each of the first type of apparatuses.

11. A non-transitory computer-readable storage medium that stores computer executable instructions for causing a computer to execute an information processing method, the information processing method comprising:
   acquiring, from one or more sensors in each of a plurality of apparatuses installed at different locations, data indicative of an operation status of each of the plurality of apparatuses taken serviceable by a plurality of servicemen;
   determining, based on the data acquired from the one or more sensors in each of the plurality of apparatuses meeting a condition, that an apparatus of the plurality of apparatuses is a first type of apparatus requiring a scheduled prioritized visit by any one of the plurality of serviceman within a predetermined period and that an apparatus of the plurality of apparatuses is a second type of apparatus when the condition is not met,
   determining, for each of the second types of apparatuses based on the data acquired from the one or more sensors, a likelihood value that the second apparatus will require an unscheduled prioritized visit;
   determining, a distance relationship between each of the first type of apparatuses and each of the second type of apparatuses based on an obtained physical location between each of the first type of apparatuses and each of the second types of apparatuses; and
   generate a visit order for each of the first type of apparatuses during a predetermined period based on
   the determined distance relationship between second types of apparatuses having a likelihood value exceeding a predetermined threshold and each of the first type of apparatuses.

12. The information processing apparatus according to claim 1, wherein execution of the instructions further configures the at least one processor to generate the visit order based on which servicemen visits a vicinity of the second type of apparatus in each time slot in the predetermined period.

13. The information processing apparatus according to claim 6, wherein execution of the instructions further configures the at least one processor to generate the visit order based on which servicemen visits a vicinity of the second type of apparatus in each time slot in the predetermined period.

* * * * *